United States Patent [19]
Neadle et al.

[11] Patent Number: 5,988,813
[45] Date of Patent: Nov. 23, 1999

[54] DIFFERENTIAL THICKNESS CONTACT LENS UTILIZING MULTIPLE BASE CURVES AND METHOD OF MANUFACTURING SAME

[75] Inventors: Susan Neadle; Timothy Clutterbuck, both of Jacksonville, Fla.

[73] Assignee: Johnson & Johnson Vision Products, Inc., Jasksonville, Fla.

[21] Appl. No.: 09/217,362

[22] Filed: Dec. 21, 1998

[51] Int. Cl.[6] .................................................. G02C 7/04
[52] U.S. Cl. ................................. 351/177; 351/160 H
[58] Field of Search ........................... 351/160 R, 160 H, 351/161, 162, 177

[56] References Cited

U.S. PATENT DOCUMENTS

| | | | |
|---|---|---|---|
| 4,573,774 | 3/1986 | Sitterle | 351/161 |
| 5,650,837 | 7/1997 | Roffman et al. | 351/161 |
| 5,652,638 | 7/1997 | Roffman et al. | 351/161 |

Primary Examiner—Scott J. Sugarman

[57] ABSTRACT

A method of producing a compensated contact lens that is compensated for power deviation from target due to differential shrinkage, and also a compensated contact lens. The invention includes the steps of designing a lens to have first and second areas of different thickness and a cylinder axis having a predetermined angular position; determining a plurality of power correction factors, one for each of a plurality of cylinder axis ranges of the lens; and modifying the lens using a selected one of the plurality of power correction factors corresponding to the cylinder axis ranges of the lens containing the cylinder axis of the lens.

19 Claims, 3 Drawing Sheets

DIFFERENTIAL THICKNESS CONTACT LENS UTILIZING MULTIPLE BASE CURVES AND METHOD OF MANUFACTURING SAME

FIELD OF THE INVENTION

The present invention relates to a differential thickness contact lens that utilizes multiple base curves to correct for deviations in sphere power and cylinder power as a result of nonuniform shrinkage, as well as a method of manufacturing such lens.

BACKGROUND OF THE INVENTION

Contact lenses are generally used to correct various types of vision problems. See, for example, U.S. Pat. Nos. 4,573,774; 5,650,837; and 5,652,638, which are incorporated herein in their entireties by reference. Also, various texts discuss the principles of contact lens design and manufacturing: Ruben et al., Contact Lens Practice (Chapman & Hall, London); Stein, Slatt & Stein, Opthalmic Terminology (C.V. Mosby Company, St. Louis, 1987), which are also incorporated herein by reference.

Astigmatism occurs when a portion of the eye focuses light at a different focal point than the rest of the eye, i.e., it is a refractive error of the eye in which the rays of light do not come to a single point focus on the retina. Toric lenses, or lenses with cylinder power, typically are used to correct for astigmatism. For toric lenses, the cylinder power is along the cylinder radius, which is orthogonal to the cylinder axis. The cylinder power of the toric lens results in the eye focusing light rays at a common focal point.

As indicated above, toricity is used to correct astigmatism so that it focuses light rays at a common point. However, the common focal point may be located at an incorrect position with respect to the retina. This condition is referred to as either "myopia" or "hyperopia". Myopia which typically results from a steep cornea that causes light rays to focus at a focal point which is short of the retina. Conversely, hyperopia is a case in which a flat cornea causes light rays to focus at a focal point that is behind the retina. Sphere power is included in a lens to cause light to property focus on the retina.

Contact lenses may include either or both spherical correction or cylinder correction depending on the particular circumstances of the lens wearer's eyes. Lenses that have only spherical correction are spherically symmetric and, thus, any rotation of the lens inside the eye is irrelevant and does not disturb the intended vision correction. Toric contact lenses, on the other hand are typically designed to include areas of different thickness, resulting in a spherically asymmetric lens. As a result, toric contact lenses need to be rotationally stabilized in the eye to insure that the lens is properly oriented with respect to the eye in order to carry out its function of correcting the vision of particular areas of the eye.

Rotational stability may be achieved using a number of designs including inferior truncation, double truncation, thin zones (also called "double slab-off"), back surface toricity and prism wedge profile. These rotation stabilizing designs may be used individually or in combination. One common feature of these rotation stabilizing designs is the use of different thickness areas in the lens to achieve rotational stability. For example, in the case of a "slab off" design, the top and bottom portions of the lens are thinned out such that when they are positioned under the eyelids they are held in place by the lids. At the same time, the thicker portions of the lens are positioned in between the eyelids where they too are held in place by abutting against the eyelids.

The process for manufacturing differential thickness lenses typically includes a curing step, which may involve UV, heat, or other similar curing process. However, as a result of the curing step, the material of the lens shrinks at different rates due to the differential thicknesses. This differential shrinkage causes the cylinder power to change as a function of position. The sphere power is also caused to change as a function of position. Conventional approaches compensate for this error using a single base curve which is applied to all lenses regardless of the angular position of the cylinder power and sphere power.

SUMMARY OF THE INVENTION

The present invention is for a differential thickness contact lens which is compensated for differential shrinkage during the manufacturing process. The present invention is also for a method of manufacturing and compensating a differential thickness lens for differential shrinkage during the manufacturing process. The change in cylinder power and sphere power caused by the nonuniform shrinkage is compensated for using a number of different base curves, instead of a single base curve. This reduces the power deviation from target caused by the induced change in cylinder power and sphere power.

The present invention is for a method of producing a compensated contact lens which is compensated for power deviation from target due to differential shrinkage, and also a compensated contact lens, which is produced using the following steps:

designing a lens to have first and second areas of different thickness and a cylinder power having a predetermined angular position;

determining a plurality of power correction factors, one for each of a plurality of angular areas of the lens; and modifying the lens using a selected one of the plurality of power correction factors corresponding to the angular area of the lens containing the angular position of the cylindrical power.

DETAILED DESCRIPTION OF THE INVENTION

Figure 1:
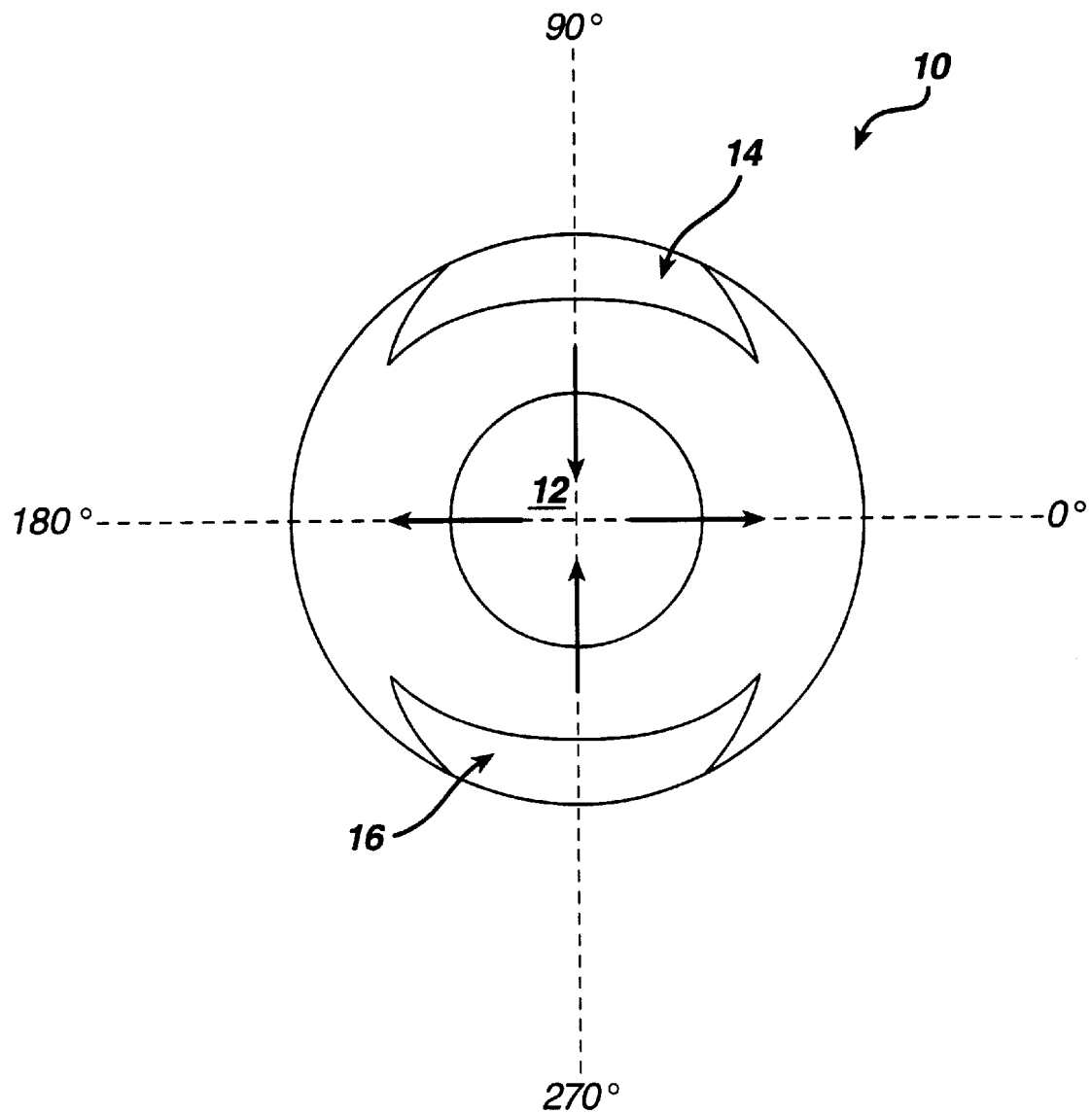
FIG. 1 is an illustration of a toric contact lens.

Referring to the drawings in detail, FIG. 1 illustrates a plan view of the front surface of a contact lens 10 having a rotationally stable design. The lens 10 includes a central optical zone 12, as well as thinned out areas 14 and 16 located at the upper and bottom regions, respectively, and intended to be positioned under the patient's eyelids.

Figure 2:
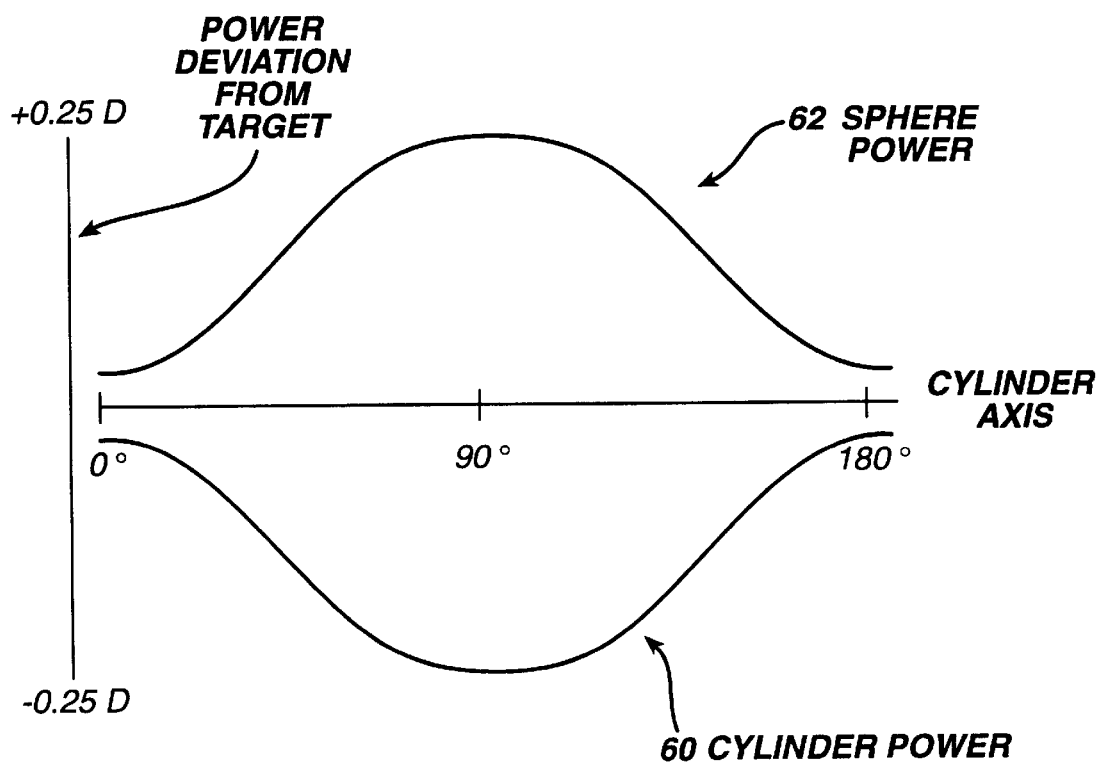
FIG. 2 is a graph illustrating the power deviation from target caused by nonuniform shrinkage.

It has been observed that a lens having areas of different thickness changes its geometry during the curing step in the manufacturing process. Curing brings about a differential shrinkage that has an effect on the cylinder power and the sphere power. Referring now to FIG. 2, therein is shown a graph of power deviation from target for both cylinder power 60 and sphere power 62 as a function of cylinder axis. This power deviation is caused by the nonuniform shrinkage of the lens. The extent of the power deviation has been determined to be a function of position, i.e., angular position of the cylinder power. For the example shown in FIG. 2, a lens having a cylinder axis at 90 degrees will experience a cylinder power deviation of almost −0.25 diopters. The sphere power is similarly affected.

Conventional techniques compensate for this power deviation by using a single, constant power correction for all different cylinder axis orientations. Because the power deviation varies a substantial amount over the range of cylinder axes, a single correction factor generally will not correct adequately across the entire range of cylinder axes.

Figure 3:
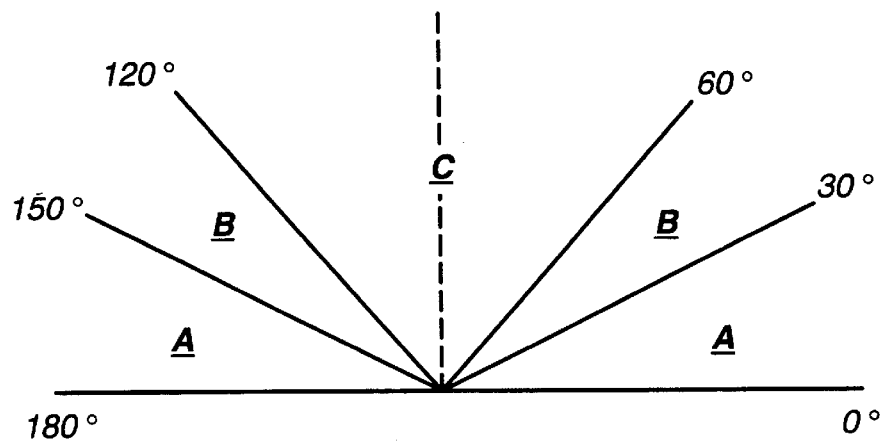
FIG. 3 is a graph illustrating the use of multiple base curves.

The present invention addresses this problem by using multiple base curves, or multiple power correction factors, one for each region of cylinder axes. This approach is shown in FIG. 3. As illustrated in FIG. 3, the 180 degree span of cylinder axis range is divided into six regions, with each region spanning 30 degrees. Three correction powers A, B, and C are utilized. Only three correction powers are needed for six regions, because the power deviation effect which is being corrected for is symmetric about the 90 degree axis. Thus, for the region 0–30 degrees, power correction factor A is used; in the region of 30–60 degrees, power correction factor B is used; and in the region 60–90 degrees, power correction factor C is used. The region from 180–90 degrees is a mirror image of the 0–90 degree region just discussed, and corresponding factors are used in the individual 30 degree regions. Although the example shown in FIG. 3 utilizes 30 degree regions, it is to be understood that the span of the cylinder axes may be divided into smaller or larger regions depending on the granularity and accuracy of the correction which is to be provided.

Figure 4:
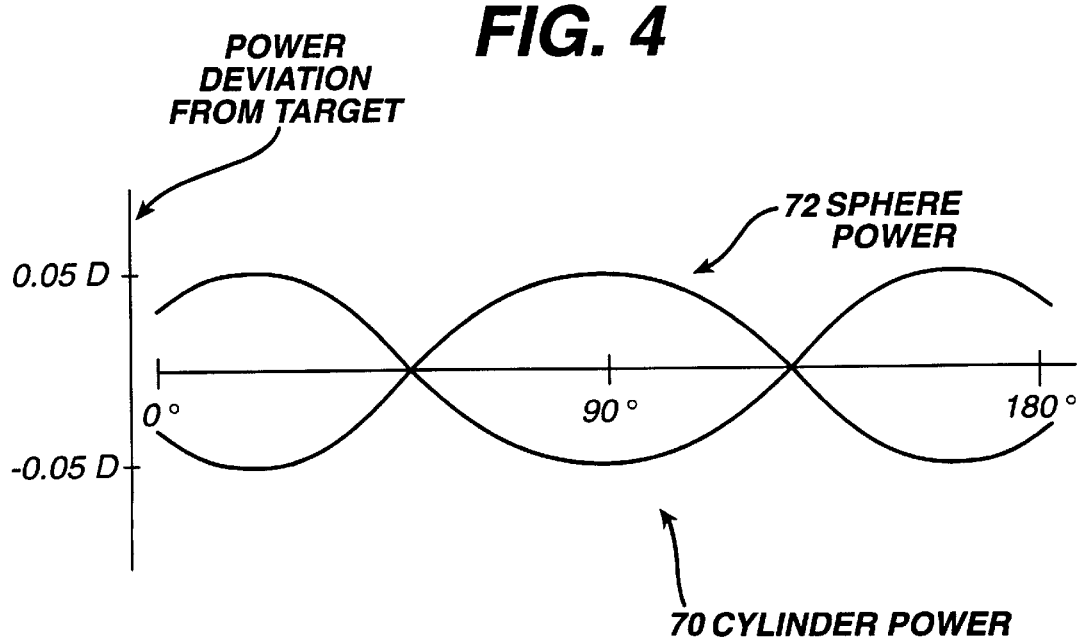
FIG. 4 is a graph illustrating the power deviation from target using the multiple base curve approach of FIG. 3.

The advantageous effect of using the approach of FIG. 3 is illustrated in FIG. 4. As shown in FIG. 4, the use of multiple base curves results in more finely tuned correction in each region. As a result, the power deviation from target is reduced to the order of 0.05 diopters. The reduction of the power deviation from target to this low level frees up some of the 0.25 diopter margin for the overall manufacturing process. The power correction is introduced by modifying the desired cylinder and sphere power in each region, which may be accomplished by adjusting the cylinder and sphere radii.

In the example shown in FIGS. 2–4, the uncompensated sphere power has a tendency to become weaker in going from region A to region C. Therefore, the sphere power is compensated by introducing incremental sphere power strength in going from region A to region C. This is achieved by reducing the sphere radius in going from region A to region C. Similarly, the uncompensated cylinder power has a tendency to become stronger in going from region A to region C. Therefore, the cylinder power is compensated by introducing incremental cylinder power weakness in going from region A to region C. This is achieved by increasing the cylinder radius in going from region A to region C.

The power correction approach of the present invention may be utilized for either front curve or back curve correction.

The present invention may be utilized in the production of soft or hard contact lenses, but preferably is used in the production of soft contact lenses. More preferably, the invention is used in the production of hydrogel lenses or silicone-containing hydrogel lenses. Many variations of the present invention will suggest themselves to those skilled in the art in light of the above, detailed description. All such variations are within the scope of the invention as set forth in the appended claims.

We claim:

1. A method of producing a contact lens which is compensated for power deviation from target due to differential shrinkage, comprising the following steps:
   designing a lens to have a first area of a first thickness, a second area of a second thickness and a cylinder axis, said first and second thicknesses being different;
   determining a plurality of power correction factors, one for each of a plurality of cylinder axis ranges;
   modifying said lens using a selected one of said plurality of power correction factors corresponding to the cylinder axis range containing the cylinder axis of the lens, to thereby produce a compensated contact lens.

2. The method of claim 1, further including the step of curing said modified lens.

3. The method of claim 1, wherein each of said power correction factors is determined based on power deviation from target caused by differential shrinkage.

4. The method of claim 1, wherein said power correction factors include cylinder power correction factors.

5. The method of claim 1, wherein said power correction factors include sphere power correction factors.

6. The method of claim 1, wherein said modifying step is carried out on a front curve of said lens.

7. The method of claim 1, wherein said modifying step is carried out on a back curve of said lens.

8. The method of claim 1, wherein each of said cylinder axis ranges comprises 30 degrees.

9. The method of claim 1, wherein said cylinder axis ranges are of equal size.

10. The method of claim 1, wherein said cylinder axis ranges are of unequal size.

11. The method of claim 1, wherein said lens is a toric lens.

12. The method of claim 1, wherein said lens is a hydrogel lens.

13. The method of claim 1, wherein said lens is a silicone-containing hydrogel lens.

14. The method of claim 11, wherein said toric lens is a hydrogel lens.

15. The method of claim 11, wherein said toric lens is a silicone-containing hydrogel lens.

16. A contact lens produced in accordance with the method of claim 1.

17. The contact lens of claim 16, wherein the lens is a toric lens.

18. The contact lens of claim 17, wherein the toric lens is a hydrogel lens.

19. The contact lens of claim 17, wherein the toric lens is a silicone-containing hydrogel lens.

* * * * *